(12) United States Patent
Li et al.

(10) Patent No.: US 12,231,731 B2
(45) Date of Patent: Feb. 18, 2025

(54) METHOD AND DEVICE FOR RECOMMENDING REAL-TIME AUDIOS AND/OR VIDEOS, AND COMPUTER STORAGE MEDIUM

(71) Applicant: BOE Technology Group Co., Ltd., Beijing (CN)

(72) Inventors: Xianzhen Li, Beijing (CN); Enhui Guan, Beijing (CN); Tianyue Zhao, Beijing (CN); Feng Zhang, Beijing (CN); Zhimao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/780,700

(22) PCT Filed: Mar. 30, 2021

(86) PCT No.: PCT/CN2021/084114
§ 371 (c)(1),
(2) Date: May 27, 2022

(87) PCT Pub. No.: WO2022/204991
PCT Pub. Date: Oct. 6, 2022

(65) Prior Publication Data
US 2024/0163515 A1    May 16, 2024

(51) Int. Cl.
*H04N 21/466* (2011.01)
*H04N 21/442* (2011.01)
*H04N 21/488* (2011.01)

(52) U.S. Cl.
CPC ... *H04N 21/4668* (2013.01); *H04N 21/44218* (2013.01); *H04N 21/4882* (2013.01)

(58) Field of Classification Search
CPC ......... H04N 21/4668; H04N 21/44218; H04N 21/4882
See application file for complete search history.

(56) References Cited

U.S. PATENT DOCUMENTS 8,260,117 B1 *  9/2012  Xu ..................... H04N 21/4668
                                                386/343
8,543,521 B2 *  9/2013  Yang ..................... G06F 16/54
                                                706/12

(Continued)

FOREIGN PATENT DOCUMENTS

CN    106658086 A    5/2017
CN    109246483 A    1/2019

(Continued)

OTHER PUBLICATIONS

Extended European search report of counterpart European application No. 21933672.4 issued on Oct. 5, 2023.

(Continued)

*Primary Examiner* — James R Sheleheda
(74) *Attorney, Agent, or Firm* — Lippes Mathias LLP

(57) ABSTRACT

Disclosed is a method for recommending real-time audios and/or videos, including acquiring description data of a plurality of real-time audios and/or videos; acquiring user data; determining at least one candidate real-time audio and/or video in the real-time audios and/or videos; acquiring audio and/or video data of the at least one candidate real-time audio and/or video upon initiation of the candidate real-time audio and/or video; acquiring content data of the at least one candidate real-time audio and/or video; acquiring a degree of association between the content data of the at least one candidate real-time audio and/or video and the user data; and displacing a target candidate real-time audio and/or video in the at least one candidate real-time audio and/or video in a user interface.

17 Claims, 10 Drawing Sheets

(56) References Cited

U.S. PATENT DOCUMENTS

| | | | | |
|---|---|---|---|---|
| 8,874,584 | B1* | 10/2014 | Chen | G06F 16/7854 |
| | | | | 707/741 |
| 9,038,107 | B2* | 5/2015 | Khoo | H04N 21/6582 |
| | | | | 725/46 |
| 9,229,958 | B2* | 1/2016 | Zhang | G06V 40/172 |
| 9,363,155 | B1* | 6/2016 | Gravino | G06Q 30/02 |
| 2007/0255755 | A1* | 11/2007 | Zhang | G06F 16/78 |
| 2008/0086456 | A1* | 4/2008 | Rasanen | H04N 21/4622 |
| | | | | 348/E7.071 |
| 2009/0055373 | A1* | 2/2009 | Haviv-Segal | G06F 16/332 |
| | | | | 707/999.005 |
| 2010/0049739 | A1* | 2/2010 | Varadarajan | G06F 16/48 |
| | | | | 707/758 |
| 2010/0070483 | A1* | 3/2010 | Delgo | G11B 27/329 |
| | | | | 707/706 |
| 2010/0082614 | A1* | 4/2010 | Yang | G06F 16/78 |
| | | | | 707/726 |
| 2011/0196859 | A1* | 8/2011 | Mei | G06F 16/248 |
| | | | | 707/723 |
| 2011/0243529 | A1* | 10/2011 | Oryoji | G06F 16/7847 |
| | | | | 386/248 |
| 2011/0320476 | A1* | 12/2011 | McRae | H04N 21/84 |
| | | | | 707/769 |
| 2012/0095958 | A1* | 4/2012 | Pereira | G06F 16/435 |
| | | | | 707/609 |
| 2012/0173502 | A1 | 7/2012 | Kumar et al. | |
| 2013/0166303 | A1* | 6/2013 | Chang | G06F 16/7834 |
| | | | | 707/723 |
| 2013/0282747 | A1* | 10/2013 | Cheng | G06F 16/732 |
| | | | | 707/758 |
| 2014/0188926 | A1* | 7/2014 | Chandel | G06F 16/435 |
| | | | | 707/767 |
| 2016/0004699 | A1* | 1/2016 | Liu | G06F 16/9535 |
| | | | | 707/734 |
| 2016/0212494 | A1* | 7/2016 | Yang | H04N 21/4668 |
| 2016/0267637 | A1* | 9/2016 | Hsiao | G06F 18/24133 |
| 2016/0357748 | A1* | 12/2016 | Hsiao | G06N 3/045 |
| 2017/0092332 | A1* | 3/2017 | Bostick | G06F 16/78 |
| 2017/0142462 | A1 | 5/2017 | Uhrich et al. | |
| 2017/0155631 | A1* | 6/2017 | Du | G06F 21/6209 |
| 2017/0352087 | A1* | 12/2017 | Nigul | G06Q 30/0631 |
| 2018/0007409 | A1* | 1/2018 | Xie | H04N 21/44204 |
| 2018/0046721 | A1* | 2/2018 | Thornton | G06F 16/9535 |
| 2019/0163752 | A1* | 5/2019 | Barlaskar | G06V 20/41 |
| 2021/0103615 | A1* | 4/2021 | Jindal | G06F 16/7837 |
| 2021/0144418 | A1* | 5/2021 | Han | H04N 21/4532 |
| 2022/0012601 | A1* | 1/2022 | Amad-Ud-Din | G06N 5/01 |
| 2022/0021940 | A1* | 1/2022 | Wang | H04N 21/440281 |
| 2022/0107978 | A1* | 4/2022 | Steffensen | G06F 16/634 |
| 2022/0156312 | A1* | 5/2022 | Nagpal | G06F 16/5866 |
| 2022/0321963 | A1* | 10/2022 | Wu | G06F 16/735 |
| 2023/0073128 | A1* | 3/2023 | Chen | H04N 21/4825 |
| 2023/0081938 | A1* | 3/2023 | Martinelli | H04N 21/4668 |
| | | | | 725/144 |
| 2023/0269432 | A1* | 8/2023 | Mohammad | H04N 21/84 |
| | | | | 725/61 |
| 2023/0362423 | A1* | 11/2023 | Zhao | H04N 21/251 |

FOREIGN PATENT DOCUMENTS

| | | |
|---|---|---|
| CN | 109379608 A | 2/2019 |
| CN | 109388693 A | 2/2019 |
| CN | 110267067 A | 9/2019 |
| CN | 110830812 A | 2/2020 |
| CN | 111163076 A | 5/2020 |
| CN | 111866528 A | 10/2020 |
| CN | 112000820 A | 11/2020 |

OTHER PUBLICATIONS

China National Intellectual Property Administration, First office action of Chinese application No. 202180000653.8 issued on Oct. 31, 2023, which is foreign counterpart application of this US application.

* cited by examiner

METHOD AND DEVICE FOR RECOMMENDING REAL-TIME AUDIOS AND/OR VIDEOS, AND COMPUTER STORAGE MEDIUM

CROSS-REFERENCE TO RELATED APPLICATION

This application is a 371 of PCT application No. PCT/CN2021/084114, filed on Mar. 30, 2021, the disclosure of which is herein incorporated by reference in its entirety.

TECHNICAL FIELD

The present disclosure relates to the field of internet technologies, and in particular, relates to a method and device for recommending real-time audios and/or videos, and a computer storage medium.

BACKGROUND

Real-time audios and/or videos, as a common way of communication and entertainment in various fields at present, may include network live streaming, network conferencing, etc., and play an important role in promoting economic and social development and enriching people's spiritual and cultural life and the like due to their intuitive, real-time and interactive content and forms.

At present, as multiple pieces of network live streaming that are of interest to a user may be played at the same time when the user watches real-time audios and/or videos, the user has to constantly switch live-streaming pictures or even switch live-streaming applications. As a result, the user will miss lots of live-streaming content that he/she is most interested in.

SUMMARY

Embodiments of the present disclosure provide a method and device for recommending real-time audios and/or videos, and a computer storage medium. The technical solutions are as follows.

According to a first aspect of the present disclosure, a method for recommending a real-time audio and/or video is provided. The method includes:
  acquiring description data of a plurality of real-time audios and/or videos;
  acquiring user data;
  determining at least one candidate real-time audio and/or video in the real-time audios and/or videos, wherein a degree of association between the description data of the at least one candidate real-time audio and/or video and the user data is greater than a first specified value;
  acquiring audio and/or video data of the at least one candidate real-time audio and/or video upon initiation of the candidate real-time audio and/or video;
  acquiring, based on the audio and/or video data of the at least one candidate real-time audio and/or video, content data of the at least one candidate real-time audio and/or video;
  acquiring a degree of association between the content data of the at least one candidate real-time audio and/or video and the user data; and
  displaying, based on the degree of association between the content data of the at least one candidate real-time audio and/or video and the user data, a target candidate real-time audio and/or video in the at least one candidate real-time audio and/or video in a user interface.

Optionally, the number of candidate real-time audios and/or videos is two or more, and upon acquiring the degree of association between the content data of the candidate real-time audios and/or videos and the user data, the method further includes:
  acquiring recommendation information of a first candidate real-time audio and/or video in the at least two candidate real-time audios and/or videos, wherein the first candidate real-time audio and/or video is a candidate real-time audio and/or video in the at least two candidate real-time audios and/or videos except the target candidate real-time audio and/or video, a degree of association between the content data of the first candidate real-time audio and/or video and the user data being greater than a second specified value, and the recommendation information includes one or more of pictures and texts;
  displaying the recommendation information in the user interface; and
  displaying, in response to acquiring an operation on the recommendation information, a candidate real-time audio and/or video corresponding to the recommendation information in the user interface.

Optionally, upon displaying the recommendation information in the user interface, the method further includes:
  acquiring text data corresponding to audio data of the candidate real-time audio and/or video corresponding to the recommendation information; and
  displaying, in response to a failure to acquire the operation on the recommendation information within a specified time, the text data in the user interface.

Optionally, displaying the text data in the user interface includes:
  displaying a prompt box in the user interface, wherein the text data is included in the prompt box, and the size of the prompt box in the user interface is less than the size of the candidate real-time audio and/or video displayed in the user interface.

Optionally, acquiring the user data includes:
  determining at least one target user who is watching the user interface; and
  acquiring the user data of the at least one target user.

Optionally, when the user data includes face data of at least one user,
  determining the at least one target user who is watching the user interface includes:
  acquiring an image containing the at least one user; and
  determining, by face recognition on the image, the at least one target user who is watching the user interface.

Optionally, acquiring the user data of the at least one target user includes:
  acquiring the user data of the at least one target user from a user database in the case that the user database includes the user data of the at least one target user; or,
  acquiring input information in the case that the user database does not include the user data of the at least one target user, and
  acquiring the user data of the at least one target user based on the input information.

Optionally, upon displaying, based on the degree of association between the content data of the at least one candidate real-time audio and/or video and the user data, the target candidate real-time audio and/or video in the at least one candidate real-time audio and/or video in the user interface, the method further includes:

acquiring the number of viewers of each of the real-time audios and/or videos in response to receiving a switching instruction; and displaying a real-time audio and/or video with the largest number of viewers in the real-time audios and/or videos in the user interface.

Optionally, upon displaying, based on the degree of association between the content data of the at least one candidate real-time audio and/or video and the user data, the target candidate real-time audio and/or video in the at least one candidate real-time audio and/or video in the user interface, the method further includes:

acquiring a degree of association between the content data of each of the at least one candidate real-time audio and/or video and user input data in response to receiving the user input data; and displaying a candidate real-time audio and/or video in the at least one candidate real-time audio and/or video in the user interface, wherein the degree of association between the content data of the candidate real-time audio and/or video and the user input data is the highest.

Optionally, acquiring the degree of association between the content data of the at least one candidate real-time audio and/or video and the user data includes:

acquiring semantics of the content data by performing semantic analysis on the content data;

acquiring semantics of the user data by performing semantic analysis on the user data; and determining a similarity between the semantics of the content data and the semantics of the user data as the degree of association between the content data and the user data.

Optionally, displaying, based on the degree of association between the content data of the at least one candidate real-time audio and/or video and the user data, the target candidate real-time audio and/or video in the at least one candidate real-time audio and/or video in the user interface includes:

displaying the target candidate real-time audio and/or video in the at least one candidate real-time audio and/or video in the user interface, wherein the degree of association between the content data of the target candidate real-time audio and/or video and the user data is the highest.

According to another aspect of the present disclosure, a device for recommending real-time audios and/or videos is provided. The device for recommending the real-time audios and/or videos includes a processor, and a memory storing at least one instruction, at least one program, a code set, or an instruction set, wherein the processor, when loading and executing the at least one instruction, the at least one program, the code set or the instruction set, is caused to perform the method for recommending the real-time audios and/or videos according to any one of the above aspects.

According to another aspect of the present disclosure, a computer non-transitory storage medium storing at least one instruction, at least one program, a code set, or an instruction set is provided, wherein the at least one instruction, the at least one program, the code set, or the instruction set, when loaded and executed by a processor, causes the processor to perform the method for recommending the real-time audios and/or videos according to any one of the above aspects.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

The specific embodiments of the present disclosure have been shown through the above accompanying drawings, and will be described in more detail below. These accompanying drawings and textual descriptions are not intended to limit the concept scope of the present disclosure through any means, but are used to illustrate the concept of the present disclosure to those skilled in the art by reference to the specific embodiments.

DETAILED DESCRIPTION

For clearer descriptions of the objectives, technical solutions, and advantages of the present disclosure, the embodiments of the present disclosure are described in detail hereinafter with reference to the accompanying drawings.

Figure 1:
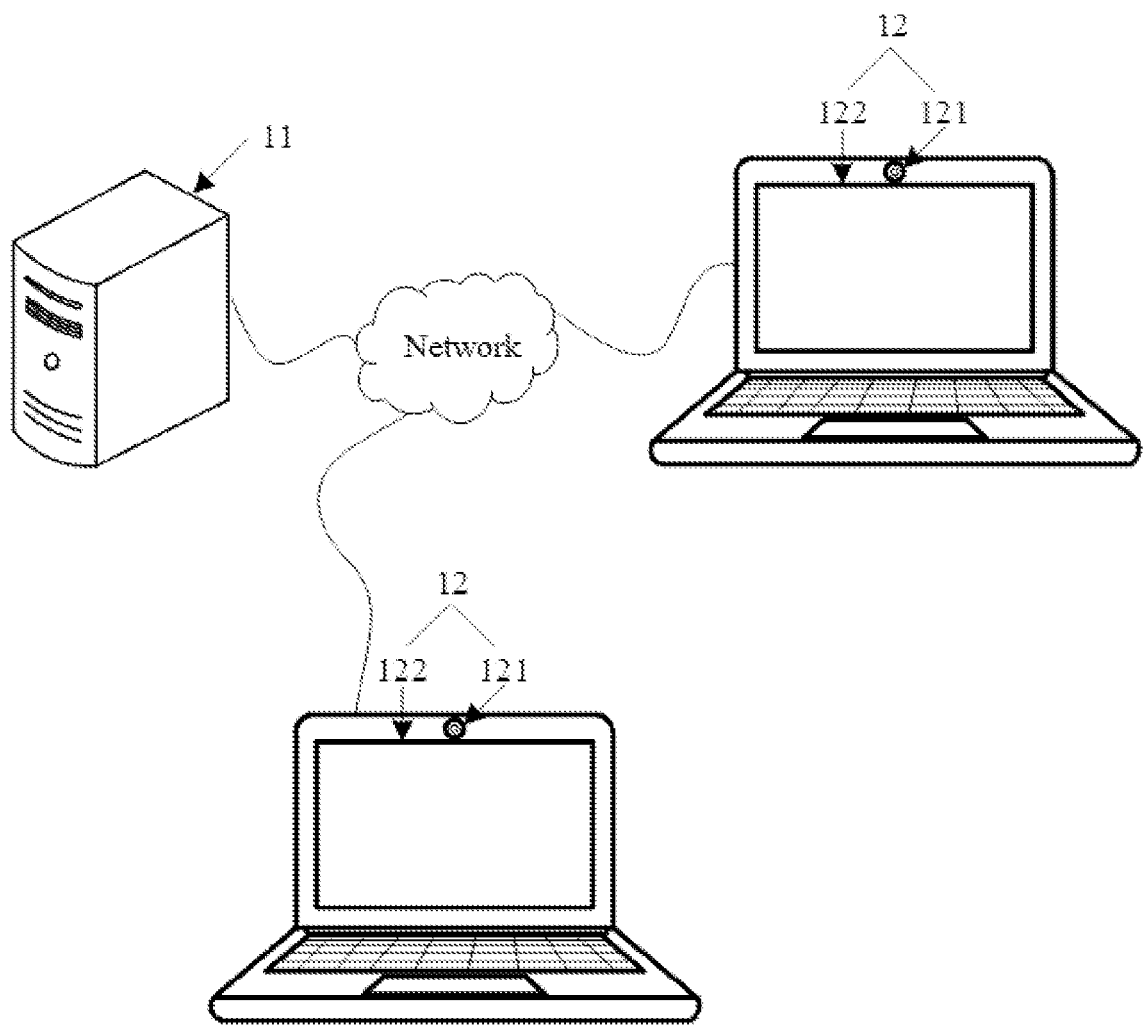
FIG. 1 is a schematic diagram of an implementation environment of a method for recommending real-time audios and/or videos according to some embodiments of the present disclosure.

FIG. 1 is a schematic diagram of an implementation environment of a method for recommending real-time audios and/or videos according to some embodiments of the present disclosure. The implementation environment may include a server 11, and one or more terminals 12 which may include a camera 121 and a display 122. The camera 121 may be disposed at one side of the display 122, which is convenient for a user to operate in the terminal 12.

The server 11 may be a server or a server cluster. The server may acquire content data of a plurality of real-time audios and/or videos and user data, and may acquire corresponding semantics by performing semantic analysis on the content data and on the user data.

The terminal 12 may be a desktop computer, a mobile phone, a tablet computer, a notebook computer and other terminals.

The terminal 12 may be connected to the server 11 in a wired or wireless fashion.

Application scenes in the embodiment of the present disclosure may include the following.

1) Real-time audios and/or videos of network live streaming are recommended when multiple pieces of network live streaming are played simultaneously, wherein the multiple pieces of the network live streaming are played at the same time, and each piece of the network live streaming may contain content that a user wants to watch. In the method according to the embodiment of the present disclosure, some network live streaming with a higher association degree can be selected based on a degree of association between forecast content of the multiple pieces of the network live streaming and user data, and the network live streaming with the highest association degree is selected based on a degree of association between content data of the network live streaming with the higher association degree and the user data, and is played. Thus, the network live streaming that the user is interested in can be quickly and accurately selected, providing excellent user experience.

2) When there are conflicts in time periods of multiple network conferences, the network conferences may be recommended, wherein the network conferences may contain multiple pieces of content that the user needs to know. In the method according to the embodiment of the present disclosure, the degree of association between the user data and content data of the network conferences can be continuously acquired before the user attends the network conferences or when the user has attended one of the network conferences. When real-time audio and/or video content of the network conference with the highest association degree at the moment is acquired, the corresponding network conference may be recommended to the user.

Figure 2:
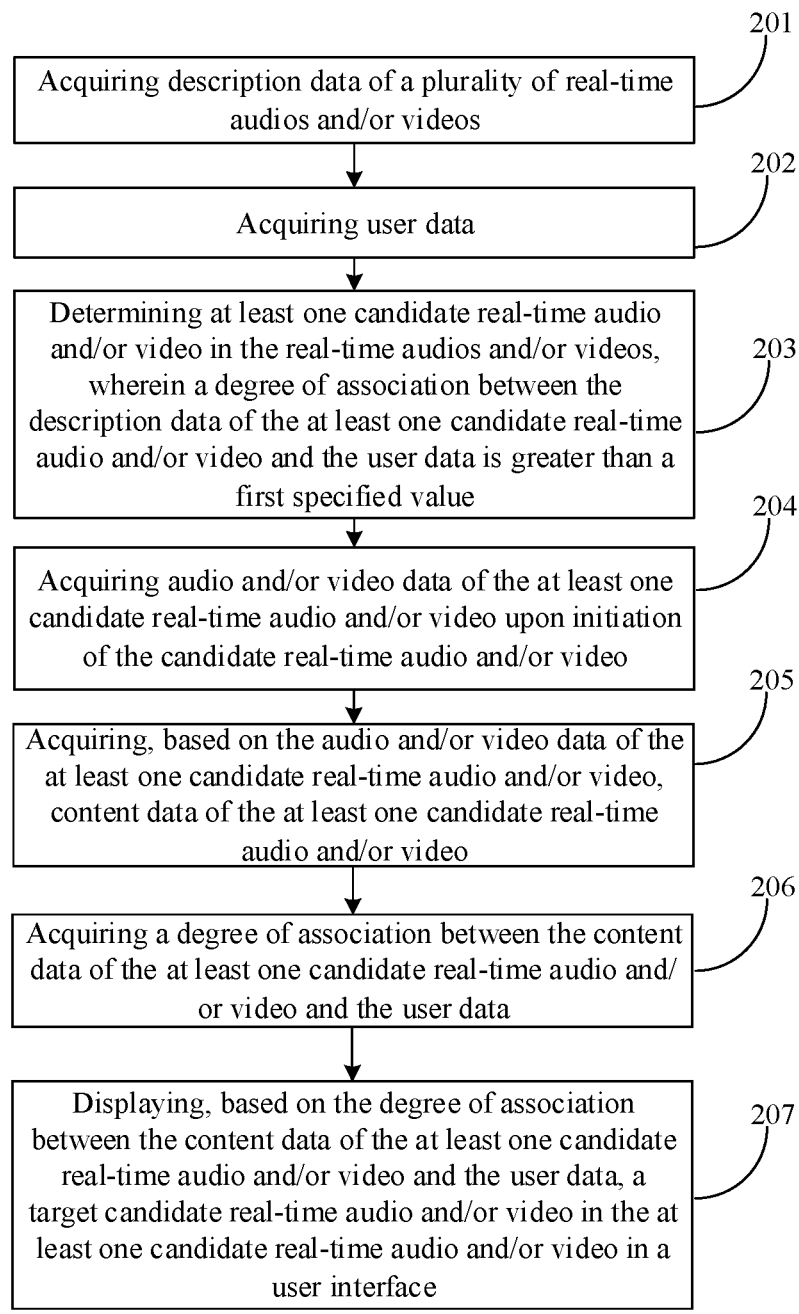
FIG. 2 is a flowchart of a method for recommending real-time audios and/or videos according to some embodiments of the present disclosure.

FIG. 2 is a flowchart of a method for recommending real-time audios and/or videos according to some embodiments of the present disclosure. The method for recommending the real-time audios and/or videos may be applied to the server in the embodiment shown in FIG. 1. The method may include the following steps.

In 201, description data of a plurality of real-time audios and/or videos is acquired.

In 202, user data is acquired.

In 203, at least one candidate real-time audio and/or video in the real-time audios and/or videos is determined, wherein a degree of association between the description data of the at least one candidate real-time audio and/or video and the user data is greater than a first specified value.

In 204, audio and/or video data of the at least one candidate real-time audio and/or video is acquired upon initiation of the candidate real-time audio and/or video.

In 205, content data of the at least one candidate real-time audio and/or video is acquired based on the audio and/or video data of the at least one candidate real-time audio and/or video.

In 206, a degree of association between the content data of the at least one candidate real-time audio and/or video and the user data is acquired.

In 207, a target candidate real-time audio and/or video in the at least one candidate real-time audio and/or video is displayed in a user interface based on the degree of association between the content data of the at least one candidate real-time audio and/or video and the user data.

It can be understood that in the embodiment of the present disclosure, an starting time of the at least one candidate real-time audio and/or video may be unfixed, and each candidate real-time audio and/or video may have its own starting time. After one candidate real-time audio and/or video is initiated, the content data of the candidate real-time audio and/or video may be acquired. Or, the user may be prompted after one candidate real-time audio and/or video is initiated; and the acquisition of the content data of the candidate real-time audio and/or video is initiated after indication information (such as touch information) of the user is acquired.

In an exemplary embodiment, the starting time of network live streaming A is 9:00, and the starting time of network live streaming B is 9:20. An execution action that the server acquires the audio and/or video data of the candidate real-time audios and/or videos from an audio and/or video server to which the candidate real-time audios and/or videos belong may be triggered based on the initiation of the real-time audios and/or videos, or may be triggered after the server acquires an operation of the user on the user interface. The operation may include a list of description data clicked, long-pressed or swiped by the user on the user interface. The list of the description data may include description data of at least one candidate real-time audio and/or video, wherein a degree of association between the description data of the at least one candidate real-time audio and/or video and the user data is greater than the first specified value. In addition, the method according to the embodiment of the present disclosure may also be applied to the terminal in the implementation environment shown in FIG. 1, which is not limited in the embodiment of the present disclosure.

In summary, in the method for recommending the real-time audios and/or videos according to the embodiments of the present disclosure, when the user watches a real-time audios and/or video, the real-time audios and/or videos to be watched are screened based on the degree of association between the user data and the description data of the real-time audios and/or videos; and after live streaming is initiated, the screened real-time audios and/or videos are screened again based on the degree of association between the user data and the content data of the real-time audios and/or videos. Through the two times of the screening, the real-time audio and/or video that the user may be interested in can be selected from a large number of the real-time audios and/or videos, and is displayed to the user. In this way, the degree of match between the real-time audio and/or video displayed to the user and the interest of the user is ensured, and the richness of the real-time audio and/or video displayed to the user is improved, thereby improving an effect of recommending the real-time audio and/or video.

At present, as multiple pieces of network live streaming that are of interest to the user may be played at the same time in a process that the user watches the real-time audios and/or videos. In a method for recommending a real-time audio and/or video in the prior art, a real-time audio and/or video that a user has watched most times in history is determined based on a browsing history of the user; and after being initiated again, the real-time audio and/or video is displayed to the user for watching conveniently. However, the repetition of the real-time audios and/or videos recommended by this method to the user is higher, causing a poorer recommendation effect.

According to the method for recommending the real-time audios and/or videos provided by the embodiments of the present disclosure, the real-time audios and/or videos that the user may be interested in can be selected from a large number of the real-time audios and/or videos. In this way, the degree of match between the real-time audio and/or video displayed to the user and the interest of the user is ensured, and the richness of the real-time audios and/or videos displayed to the user is higher, providing a better recommendation effect.

Figure 3:
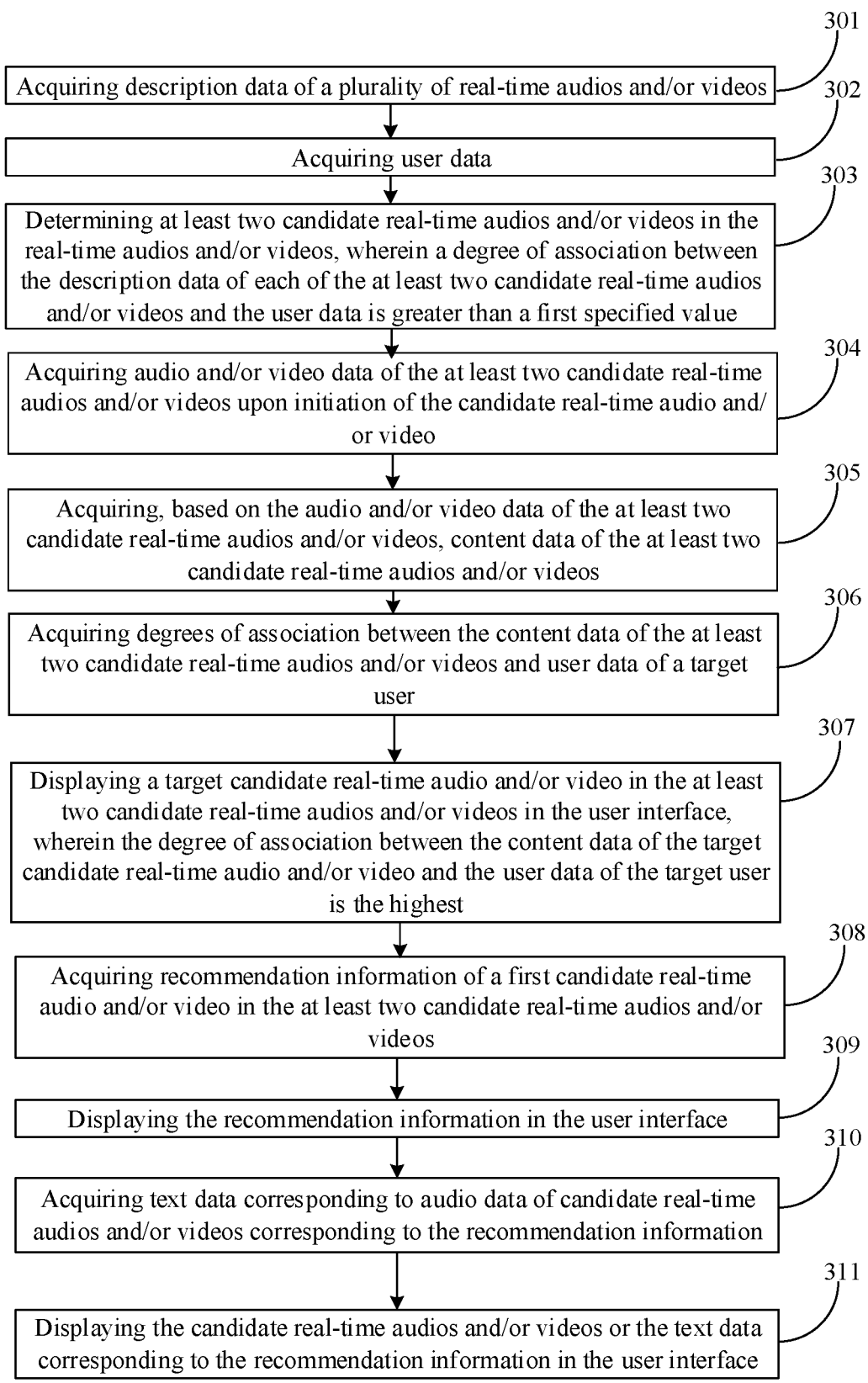
FIG. 3 is a flowchart of another method for recommending real-time audios and/or videos according to some embodiments of the present disclosure.

FIG. 3 is a flowchart of another method for recommending real-time audios and/or videos according to some embodiments of the present disclosure. The method for recommending the real-time audios and/or videos may be applicable to the server in the embodiments shown in FIG. 1. The method may include the following steps.

In 301, description data of a plurality of real-time audios and/or videos is acquired.

Here, the real-time audio and/or video may include a real-time video, a real-time audio, and real-time data including an audio and a video.

The description data may include the forecast content, themes, main topics and the like of the real-time audios and/or videos, and may summarize the content of the real-time audios and/or videos.

The real-time audios and/or videos may include live-streaming programs or online conferences. Before the real-time audios and/or videos are initiated, the server may acquire forecast content of multiple pieces of live streaming, or acquire main topics of the online conferences based on conference notice of the online conferences. In an exemplary embodiment, the description data may include "xxx new product press conference", "theme conference on XXX", "seminar on the development prospect of XXX", "audio and/or video clips for previewing live streaming", etc.

In 302, user data is acquired.

In the embodiment of the present disclosure, multiple users may watch a real-time audio and/or video by the same terminal, and corresponding user data may include user data of the users. The server may acquire the user data from a user database. The user data may include face data of at least one user.

The server may establish the user database by collecting the user data of the users in advance, wherein the user data may be acquired after the server processes information input by the users. In an exemplary embodiment, the users may send the user input information to the server through the terminal.

Optionally, 302 may include the following.

1) At least one target user who is watching the user interface is determined.

In an application process of the method for recommending the real-time audios and/or videos, some of users may watch the real-time audio and/or video played in the user interface for a certain time period, and the target users may include these users. In this case, by acquiring an image of users who are watching the user interface, the server may determine the users who are watching the user interface at this time as the target users by face recognition. That is, the real-time audio and/or video with the highest association degree can be recommended based on the target users who are watching the real-time audio and/or video. Thus, data of users who are not watching the real-time audio and/or video are not compared, such that the recommendation accuracy is further improved.

The above 1) may include the following.

In 1.1, an image containing the at least one user is acquired.

The server may acquire the image of users uploaded by the terminal from the terminal, wherein the users may include the users watching the user interface, and the image may be collected by the camera of the terminal.

In 1.2, the at least one target user who is watching the user interface is determined by performing face recognition on the image.

The server may acquire face data of the users (the face data of the users may also be disposed in the user database and corresponds to the user data in the user database one by one) in advance, wherein each piece of the face data corresponds to one user. In this step, the server may acquire face data of the users who is watching the user interface by performing face recognition on the image through steps of face image detection, face image preprocessing and face image feature extraction, and determine target users who are watching the user interface by comparing the face data acquired by the face recognition with the face data acquired in advance. In an exemplary embodiment, the server may, by face image matching and recognition, search and match based on the face data of the users watching the user interface and the face data of the users acquired in advance, set a threshold, and output a matching result when a similarity exceeds the threshold, wherein the output result represents the target users.

In 2), the user data of the at least one target user is acquired.

The above 2) may include the following.

In 2.1, the user data of the at least one target user is acquired from the user database in the case that the user database includes the user data of the at least one target user.

The user database may include the user data of the users acquired by the server in advance. Before acquiring the user data of the users who are watching the user interface, it can be determined whether the user database includes the user data of the target users, and if the user database includes the user data of the target users, the user data of the target users may be acquired from the user database.

In 2.2, input information is acquired in the case that the user database does not include the user data of the at least one target user.

The target users who are watching the user interface may also include a new user whose user data is not included in the user database, and thus, the server may acquire the user data of the new user at the scene.

Here, the input information may include input data of at least one user who is watching the user interface, and may be sent to the server by the new user through the terminal.

In 2.3, the user data of the at least one target user is acquired based on the input information.

The server may acquire the user data of the target user based on the input information of the target user.

Meanwhile, the server may add the user data and the face data of the target user to the user database, such that the user can watch the real-time audio and/or video later.

Figure 4:
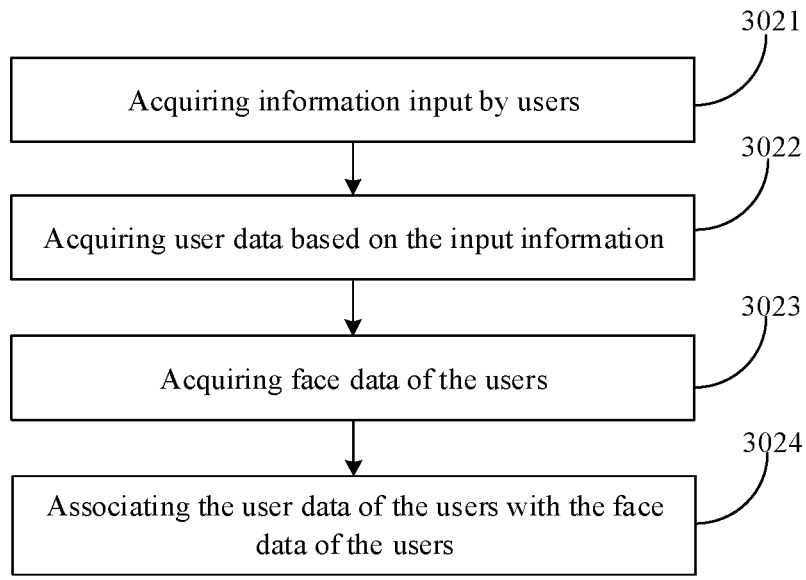
FIG. 4 is a flowchart of establishing a user database in the method shown in FIG. 3.

As shown in FIG. 4, the process of establishing the user database may include the following four sub-steps.

In 3021, information input by users is acquired.

The input information may include personal related information input by the plurality of users through the terminal, wherein the personal related information may include the industry, professional background, hobbies, etc.

In 3022, multiple pieces of user data are acquired based on the input information.

The server may acquire the input information from the terminal and extract keywords from the input information as the user data. In an exemplary embodiment, the keywords may include "food", "digital", "computer technology", "home decoration", etc.

In 3023, face data of the users is acquired.

The face data of the users may be collected by the camera of the terminal, and the server may acquire the face data of the users uploaded by the terminal.

The camera is configured to collect an image of the user who is watching the user interface. In an exemplary embodiment, the camera may further include a flash lamp. The flash lamp may be a single-color temperature flash lamp or a dual color temperature flash lamp. The dual color temperature flash lamp refers to a combination of a warm light flash lamp and a cold light flash lamp, and may be configured for light compensation at different color temperatures, thereby improving the clarity of the image.

The server acquires the face data of the users through the steps of face image detection, face image preprocessing, face image feature extraction and the like.

In 3024, the user data of the users is associated with the face data of the users.

The face data of the users collected by the camera of the terminal may be associated with the user data of the users by the server, such that the face data of the users may be in one-to-one correspondence with the user data, and the corresponding user data can be called through the face recognition when the users watch the real-time video using the same terminal.

The server may establish the user database by acquiring the user data of the users through the above 3021 to 3024.

In 303, at least two candidate real-time audios and/or videos in the real-time audios and/or videos are determined, wherein a degree of association between the description data of each of the at least two candidate real-time audios and/or videos and the user data is greater than a first specified value.

After acquiring the description data, the server may determine the degree of association between the description data of each real-time audio and/or video and the user data, and determine the at least two candidate real-time audios and/or videos for which the degree of association is greater than the first specified value.

Figure 5:
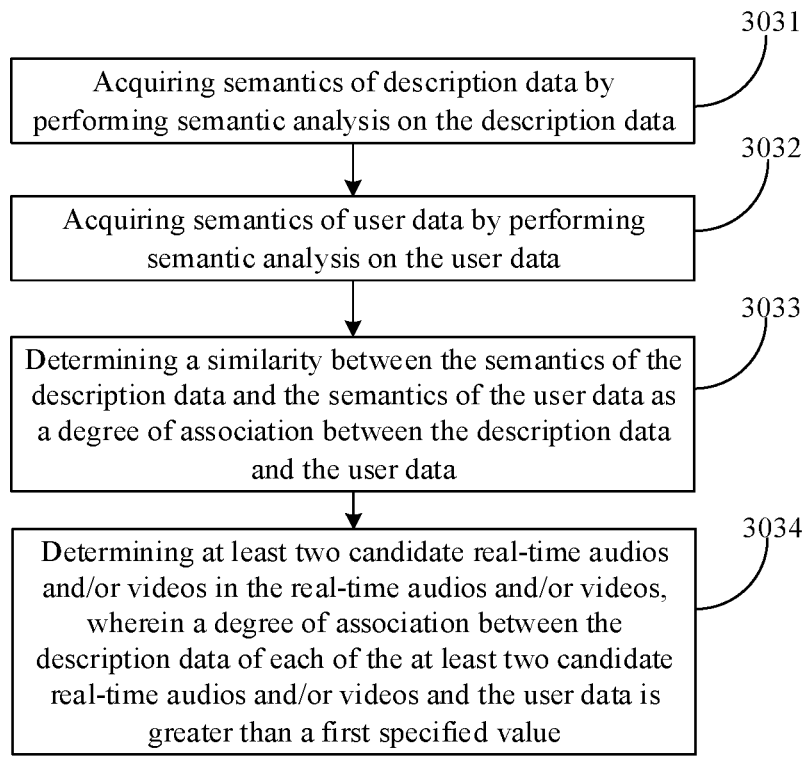
FIG. 5 is a flowchart of determining at least two candidate real-time audios and/or videos for which degrees of association between description data of the at least two candidate real-time audios and/or videos and user data are greater than a first specified value.

As shown in FIG. 5, 303 may include the following four sub-steps.

In 3031, semantics of the description data is acquired by performing semantic analysis on the description data.

The server may acquire the semantic information by performing semantic analysis on the description data and user data in the form of texts.

Optionally, the server may acquire the semantic information by performing semantic analysis on chat information in the form of texts using the natural language processing (NLP) technology. For example, after performing semantic analysis on "seminar on the development prospect of computer technology" and "computer technology" in the above description data and user data by applying the NLP technology, the server may know that the real-time audio and/or video may be a conference on the computer technology. The interests and hobbies of the user include semantic information of the computer technology.

Here, the NLP technology is an important branch in the fields of computer science and artificial intelligence, and can realize various theories and methods of effective communication between people and computers in natural language.

When the description data is an audio and/or video segment, the server may acquire text information (such as text information acquired by image recognition and text information acquired by voice recognition) based on the video and the audio, and then perform the semantic analysis on the acquired text information to acquire the semantics of the description data.

In 3032, semantics of the user data is acquired by performing semantic analysis on the user data.

The server may acquire preference of the user in watching the real-time audios and/or videos included in the user data through analysis based on the acquired user data.

In 3033, a similarity between the semantics of the description data and the semantics of the user data is determined as a degree of association between the description data and the user data.

Optionally, the similarity between the semantics of the description data and the semantics of the user data may be judged by a method for calculating a semantic distance between words in a classification system fashion, wherein this method is also called a tree-based semantic similarity research method. The tree-based semantic similarity research method may include: calculating the similarity using a semantic dictionary which is a dictionary based on cognitive linguistics that organizes all words in one or several tree-like hierarchical structures. In a tree diagram, there is one and only one path between any two nodes, and thus, the length of this path may be used as a measure of the semantic distance between the two words in concept. The shorter the distance is, the higher the similarity is.

The higher the similarity between the semantics of the description data and the semantics of the user data is, the higher the overlap between data of the preference of the user for the real-time audios and/or videos and the description data is, and the higher the degree of association between the real-time audios and video and the user data is.

In 3034, at least two candidate real-time audios and/or videos in the real-time audios and/or videos are determined, wherein a degree of association between the description data of each of the at least two candidate real-time audios and/or videos and the user data is greater than a first specified value.

The first specified value may be related to the degree of association between the description data and the user data. In an exemplary embodiment, the real-time audios and/or videos may be ranked based on the degree of association between the description data of the real-time audios and/or videos and the user data, and determine the real-time audios and/or videos ranked after the tenth as candidate real-time audios and/or videos for which association degrees between description data of the candidate real-time audios and/or videos and the user data are less than or equal to the first specified value.

When the degree of association between the description data of the real-time audio and/or video and the user data is less than or equal to the first specified value, it may indicate that the user is not interested in the real-time audio and/or video, and this real-time audio and/or video may be removed by the server, such that the comparison of the degree of association can be performed again based on the initiated candidate real-time audio and/or video. Thus, the real-time audios and/or videos that meet the needs of the user can be selected more accurately. Meanwhile, the comparison time of the degree of association can be shortened, thereby reducing the pressure of the server.

In 304, audio and/or video data of the at least two candidate real-time audios and/or videos is acquired upon initiation of the candidate real-time audio and/or video.

After the initiation of network live streaming or a network conference, the server may acquire the audio and/or video data of the at least two candidate real-time audios and/or videos from an audio and/or video server (for example, the server of a live-streaming platform or the network conference) to which the candidate real-time audios and/or videos belong. The audio and/or video data may include video data and audio data, and further include picture data, document data, etc.

In an exemplary embodiment, the candidate real-time audio and/or video is the online conference. In an online conference system, the real-time audio and/or video data may be acquired by recording, shooting by a camera, sharing with PPTs, and other forms at a conference site, and uploaded to the audio and/or video server.

In 305, content data of the at least two candidate real-time audios and/or videos is acquired based on the audio and/or video data of the at least two candidate real-time audios and/or videos.

The content data may include data that can reflect actual content of the real-time audios and/or videos. For example, the content data may include text data extracted from a video image of the real-time audios and/or videos or text data converted from sound data of the real-time audios and/or videos, content contained in the document data, etc.

In an exemplary embodiment, the content data may include bullet screen comments of a live-streaming program, data displayed on a screen of a live-streaming conference, content of a banner of an online conference site, and content of PPTs of an online conference.

In 306, degrees of association between the content data of the at least two candidate real-time audios and/or videos and the user data of the target user are acquired.

In the method for recommending the real-time audios and/or videos shown in the embodiment of the present disclosure, the degree of association between the content data and the user data can be determined based on the similarity between the semantics of the content data and the semantics of the user data.

Figure 6:
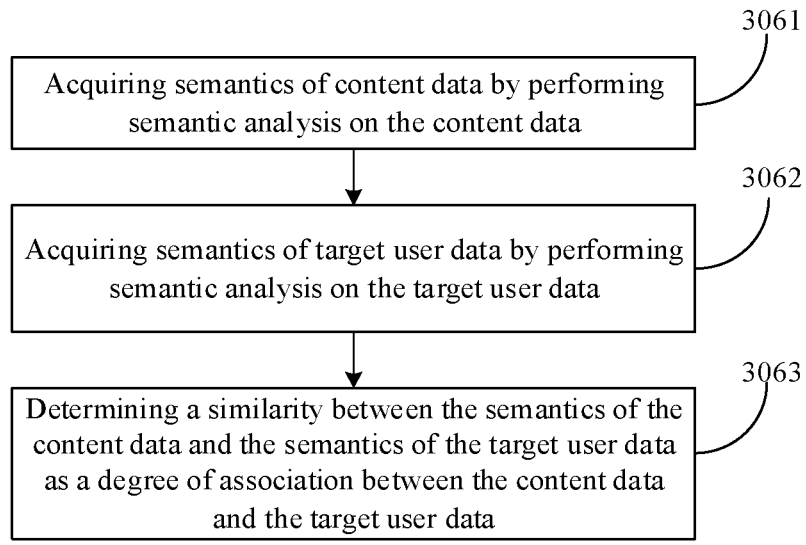
FIG. 6 is a flowchart of acquiring degrees of association between content data of at least two candidate real-time audios and/or videos and user data of a target user in the method shown in FIG. 3.

As shown in FIG. 6, 306 may include the following three sub-steps.

In 3061, semantics of the content data is acquired by performing semantic analysis on the content data.

The server may acquire the semantics of the content data by performing semantic analysis on the content data in the form of texts. The method for semantic analysis may refer to the above 3031, and is not repeated in the embodiment of the present disclosure herein.

In 3062, semantics of target user data is acquired by performing semantic analysis on the target user data.

The server may acquire the interest preference of a target user who is watching the candidate real-time audio and/or video in the user interface by performing semantic analysis on data of the screened target user.

In 3063, a similarity between the semantics of the content data and the semantics of the target user data is determined as a degree of association between the content data and the target user data.

The higher the similarity between the semantics of the content data and the semantics of the target user data is, the higher the overlap between data of the preference of the user for the real-time audios and/or videos and the content data is, and the higher the degree of association between the candidate real-time audio and/or video and the target user data is.

The at least two candidate real-time audios and/or videos may be ranked by priority depending on the degree of association. The highest association degree is the first priority, the second association degree is the second priority, and so on, and the at least two candidate real-time audios and/or videos are ranked. In an exemplary embodiment, the at least two pieces of network live streaming may be ranked by priority depending on the degree of association, wherein the degree of association ranges from 0 to 10. The higher the number is, the higher the degree of association is. The ranking results are shown in Table 1.

TABLE 1

| Priority Ranking of Network Live Streaming | | |
| --- | --- | --- |
| Name of Network Live Streaming | Association Degree | Priority |
| Network Live Streaming A | 9.6 | 1 |
| Network Live Streaming B | 9.3 | 2 |
| Network Live Streaming C | 9.1 | 3 |
| Network Live Streaming D | 8 | 4 |
| Network Live Streaming E | 7.3 | 5 |
| Network Live Streaming F | 6.9 | 6 |

Here, Table 1 shows the degree of association and priority orders of the network live streaming A to F. In an exemplary embodiment, the degree of association of the network live streaming E is 7.3 and the priority is 5.

In 307, a target candidate real-time audio and/or video in the at least two candidate real-time audios and/or videos is displayed in the user interface, wherein the degree of association between the content data of the target candidate real-time audio and/or video and the user data of the target users is the highest.

Based on the comparison of the degree of association between the content data and the user data of the target users, the target candidate real-time audio and/or video with the highest association degree may be displayed in the user interface, namely, the target candidate real-time audio and/or video ranked with the first priority.

In 308, recommendation information of a first candidate real-time audio and/or video in the at least two candidate real-time audios and/or videos is acquired. Here, the first candidate real-time audio and/or video is a candidate real-time audio and/or video in the at least two candidate real-time audios and/or videos except the target candidate real-time audio and/or video, and the degree of association between the content data of the first candidate real-time audio and/or video and the user data is greater than the second specified value. The recommendation information includes one or more of a picture, a text, and a small window video picture.

When the degree of association between the content data of the first candidate real-time audio and/or video, other than the target candidate real-time audio and/or video, and the user data is greater than the second specified value, the first candidate real-time audio and/or video may be the real-time audio and/or video data that the user is interested in. At this time, the user may choose the first candidate real-time audio and/or video to watch.

Recommendation information corresponding to the candidate real-time audio and/or video ranked with the second priority in the at least two candidate real-time audio and/or video may also be acquired.

The recommendation information may include one or more of a video screenshot, a text converted from voice data, and a small window video picture.

In 309, the recommendation information is displayed in the user interface.

In the embodiment of the present disclosure, the display order of the target candidate real-time audio and/or video with the highest association degree and the recommendation information is not limited. Here, the target candidate real-time audio and/or video with the highest association degree can be displayed first, and then the recommendation information is displayed; or the recommendation information is displayed first, and then the target candidate real-time audio and/or video is displayed. That is, the recommendation information may be displayed in the user interface while the target candidate real-time audio and/or video is displayed in the user interface.

Figure 7:
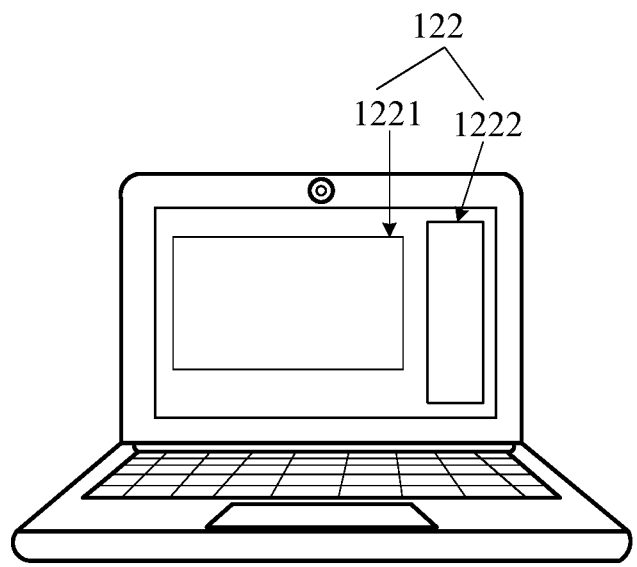
FIG. 7 is a user interface according to some embodiments of the present disclosure.

In an exemplary embodiment, as shown in FIG. 7, which is a user interface according to some embodiments of the present disclosure, a displayer 122 of the user interface displays a displaying box 1221 for the target candidate real-time audio and/or video with the highest association degree. Meanwhile, a recommendation information box 1222 containing recommendation information is displayed in the displayer 122. The recommendation information box 1222 is smaller than the displaying box 1221 for the target candidate real-time audio and/or video with the highest association degree. The recommendation information may include one or more pieces of recommendation information corresponding to one or more candidate real-time audios and/or videos with the degree of association greater than the second specified value, or recommendation information corresponding to the candidate real-time audio and/or video ranked with the second priority. At this time, the user may know the recommendation information of the one or more pieces of candidate real-time audio data with higher association degree(s) while watching the target candidate real-time audio and/or video with the highest association degree. In the following watching process, the user may choose to continue watching the target candidate real-time audio and/or video with the highest association degree, or switch the displaying box of the user interface based on the recommendation information, such that the user can have more choices in the watching process, thereby improving the user experience.

In 310, text data corresponding to audio data of the candidate real-time audios and/or videos corresponding to the recommendation information is acquired.

The server may convert audio data in the real-time audio data into the corresponding text data.

The audio data of the candidate real-time audios and/or videos corresponding to the recommendation information has a higher association degree with the target user data, and the user may pay more attention to these candidate real-time audios and/or videos. The corresponding text data of the candidate real-time audios and/or videos is acquired. After the user chooses and watches one of the candidate real-time audios and/or videos, the text data of the other real-time audio and/or video data can be displayed, such that the user can master more information.

In 311, the candidate real-time audios and/or videos or the text data corresponding to the recommendation information are displayed in the user interface.

Two implementations of 311 may as followings.

In one implementation, one candidate real-time audio and/or video corresponding to the recommendation information is displayed in the user interface in response to acquiring an operation on the recommendation information.

One candidate real-time audio and/or video corresponding to the recommendation information is displayed in the user interface after the server acquires an operation on the recommendation information in the user interface. The operation may include one of clicking, long pressing and swiping. If the candidate real-time audio and/or video with the degree of association greater than the second specified value includes one candidate real-time audio and/or video, this real-time audio and/or video is played. If the candidate real-time audios and/or videos with the degree of association greater than the second specified value include at least two candidate real-time audios and/or videos, one of the candidate real-time audios and/or videos corresponding to the operation of the user is played.

In the other implementation, the text data is displayed in the user interface in response to failure to acquire the operation on the recommendation information within a specified time.

The specified time may be 5 seconds to 10 seconds. The target candidate real-time audio and/or video with the highest association degree may be displayed in the user interface in response to a failure to acquire the operation on the recommendation information within 5 to 10 seconds. Meanwhile, the text data is displayed in the user interface.

Figure 8:
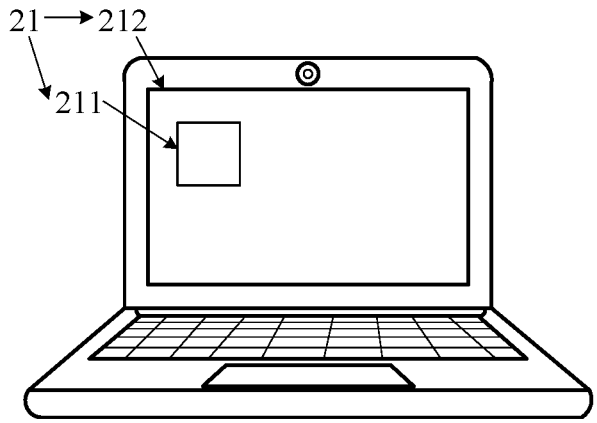
FIG. 8 is another user interface according to some embodiments of the present disclosure.

As shown in FIG. 8, which is another user interface according to some embodiments of the present disclosure, the user interface 21 may include a prompt box 211 displayed in the user interface 21. Text data is included in the prompt box 211. The size of the prompt box 211 in the user interface 21 is smaller than that of the target candidate real-time audio video 212 displayed in the user interface 21. The prompt box 211 may be disposed at a corner of the target candidate real-time audio video 212 distal from the center thereof, such that the prompt box 211 will not block important content in the target candidate real-time audio video.

In addition, the user interface may further display conference topics, information of attendees, etc. Meanwhile, the user may input texts or voices to interact with attendees in this conference room and different sessions or may click for selection by an electronic table board, such that the user can exchange information with the attendees in different sessions, thereby improving the user experience.

Figure 9:
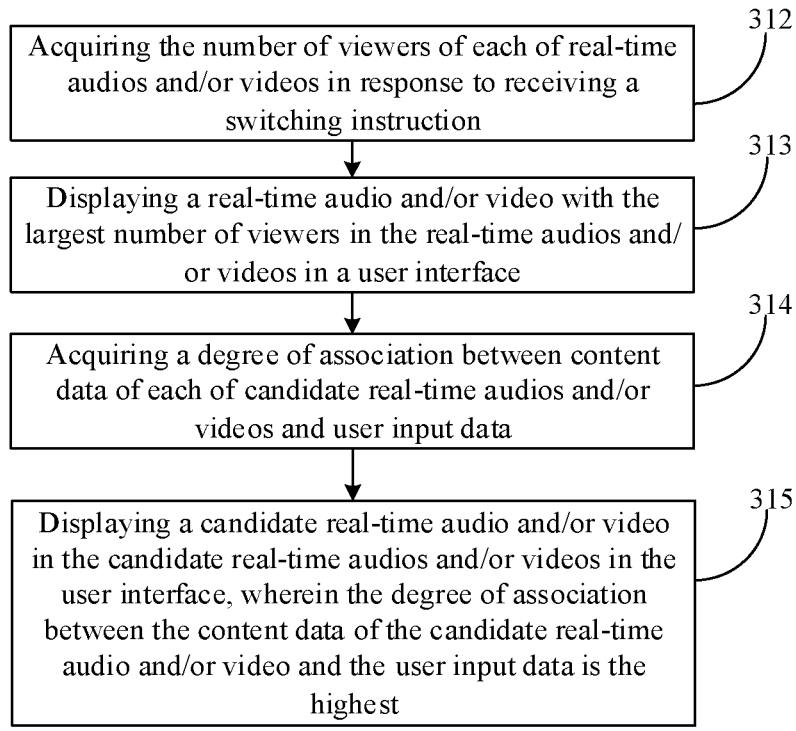
FIG. 9 is a flowchart of yet another method for recommending real-time audios and/or videos according to some embodiments of the present disclosure.

Optionally, as shown in FIG. 9, after 311 of the above embodiment, the following steps may be further included.

In 312, the number of viewers of each of the real-time audios and/or videos is acquired in response to receiving a switching instruction.

When the user is not interested in the recommended videos or aimlessly watches and browses videos, the server may further screen multiple real-time audios and/or videos based on the number of the viewers watching the real-time audios and/or videos.

When receiving a switching instruction to screen the real-time audios and/or videos through the number of the viewers, the server acquires the number of the viewers watching the real-time audios and/or videos from the audio and/or video server. The instruction may be displayed in an operation interface for the user to operate. In an exemplary embodiment, the instruction may be a button control in the user interface, and the button control may include content of "the most popular live streaming", "the hottest one at present", or the like.

In 313, a real-time audio and/or video with the largest number of viewers in the real-time audios and/or videos is displayed in the user interface.

The server ranks the real-time audios and videos based on the numbers of the viewers watching the real-time audios and/or videos, and selects and displays the real-time audio and/or video with the largest number of the viewers.

In 314, a degree of association between the content data of each of the candidate real-time audios and/or videos and user input data is acquired.

When the user is not interested in the recommended video, the real-time audios and/or videos can be further screened based on the user input data.

The user input data may include keywords input by the user based on what he/she wants to watch.

The server may perform semantic analysis on the content data of the candidate real-time audios and/or videos and the user input data, and acquire the degree of association between the content data of the candidate real-time audios and/or videos and the user input data based on the acquired semantic information.

In 315, a candidate real-time audio and/or video in the candidate real-time audios and/or videos is displayed in the user interface, wherein the degree of association between the content data of the candidate real-time audio and/or video and the user input data is the highest.

In this way, the real-time audio and/or video can be displayed based on the user's wishes, such that the user experience is improved.

In the embodiment of the present disclosure, the implementation order of 312, 313, 314 and 315 is not limited. That is, 312 and 313 may be implemented first, and then 314 and 315 are implemented; or 314 and 315 may be implemented first, and then steps 312 and 313 are implemented; or only 312 and 313 are implemented; or only 314 and 315 are implemented. If the user does not switch an instruction or input data on the user interface when he/she is watching the screened video, there is no need to execute 312 and 313, or 314 and 315.

In summary, in the method for recommending the real-time audios and/or videos according to the embodiments of the present disclosure, when the user watches a real-time audios and/or video, the real-time audios and/or videos to be watched are screened based on the degree of association between the user data and the description data of the real-time audios and/or videos; and after live streaming is initiated, the screened real-time audios and/or videos are screened again based on the degree of association between the user data and the content data of the real-time audios and/or videos. Through the two times of the screening, the real-time audio and/or video that the user may be interested in can be selected from a large number of the real-time audios and/or videos, and is displayed to the user. In this way, the degree of match between the real-time audio and/or video displayed to the user and the interest of the user is ensured, and the richness of the real-time audio and/or video displayed to the user is improved, thereby improving an effect of recommending the real-time audio and/or video.

Figure 10:
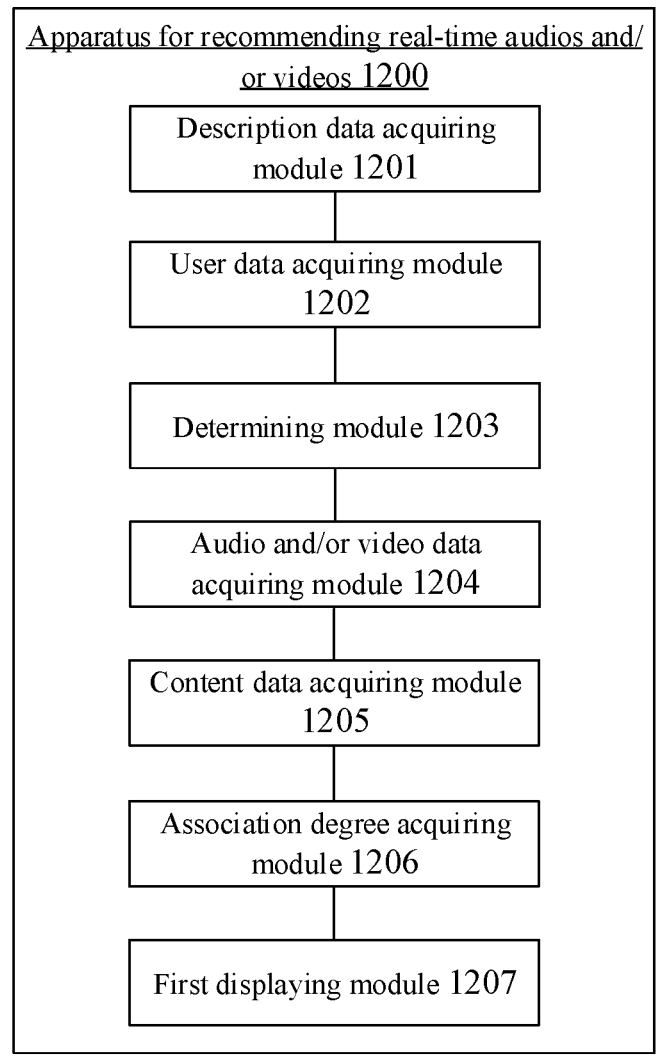
FIG. 10 is a structural block diagram of an apparatus for recommending real-time audios and/or videos according to some embodiments of the present disclosure.

FIG. 10 is a structural block diagram of an apparatus for recommending real-time audios and/or videos according to some embodiments of the present disclosure. The apparatus 1200 for recommending the real-time audios and/or videos includes:

a description data acquiring module 1201, configured to acquire description data of a plurality of real-time audios and/or videos;

a user data acquiring module 1202, configured to acquire user data;

a determining module 1203, configured to determine at least one candidate real-time audio and/or video in the real-time audios and/or videos, wherein a degree of association between the description data of the at least one candidate real-time audio and/or video and the user data is greater than a first specified value;

an audio and/or video data acquiring module 1204, configured to acquire audio and/or video data of the at least one candidate real-time audio and/or video upon initiation of the candidate real-time audio and/or video;

a content data acquiring module 1205, configured to acquire, based on the audio and/or video data of the at least one candidate real-time audio and/or video, content data of the at least one candidate real-time audio and/or video;

an association degree acquiring module 1206, configured to acquire a degree of association between the content data of the at least one candidate real-time audio and/or video and the user data; and a first displaying module 1207, configured to display, based on the degree of association between the content data of the at least one candidate real-time audio and/or video and the user data, a target candidate real-time audio and/or video in the at least one candidate real-time audio and/or video in a user interface.

Figure 11:
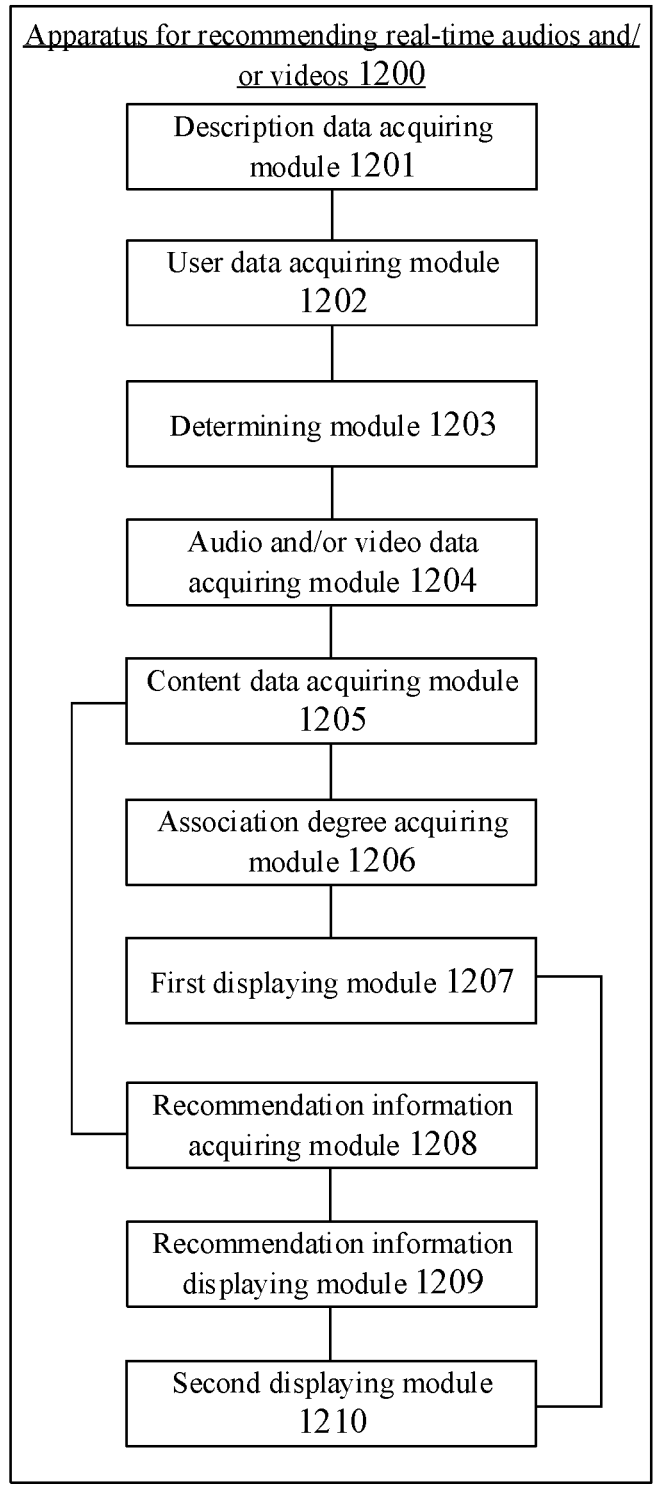
FIG. 11 is a block diagram of another apparatus for recommending real-time audios and/or videos according to some embodiments of the present disclosure.

Optionally, as shown in FIG. 11, which is a block diagram of another apparatus for recommending real-time audios and/or videos according to some embodiments of the present disclosure, the apparatus 1200 for recommending the real-time audios and/or videos further includes:

a recommendation information acquiring module 1208, configured to acquire recommendation information of a first candidate real-time audio and/or video in the at least two candidate real-time audios and/or videos, wherein the first candidate real-time audio and/or video is a candidate real-time audio and/or video in the at least two candidate real-time audios and/or videos except the target candidate real-time audio and/or video, a degree of association between the content data of the first candidate real-time audio and/or video and the user data being greater than a second specified value, and the recommendation information includes one or more of pictures and texts;

a recommendation information displaying module 1209, configured to display the recommendation information in the user interface; and a second displaying module 1210, configured to display, in response to acquiring an operation on the recommendation information, a candidate real-time audio and/or video corresponding to the recommendation information in the user interface is acquired.

Figure 12:
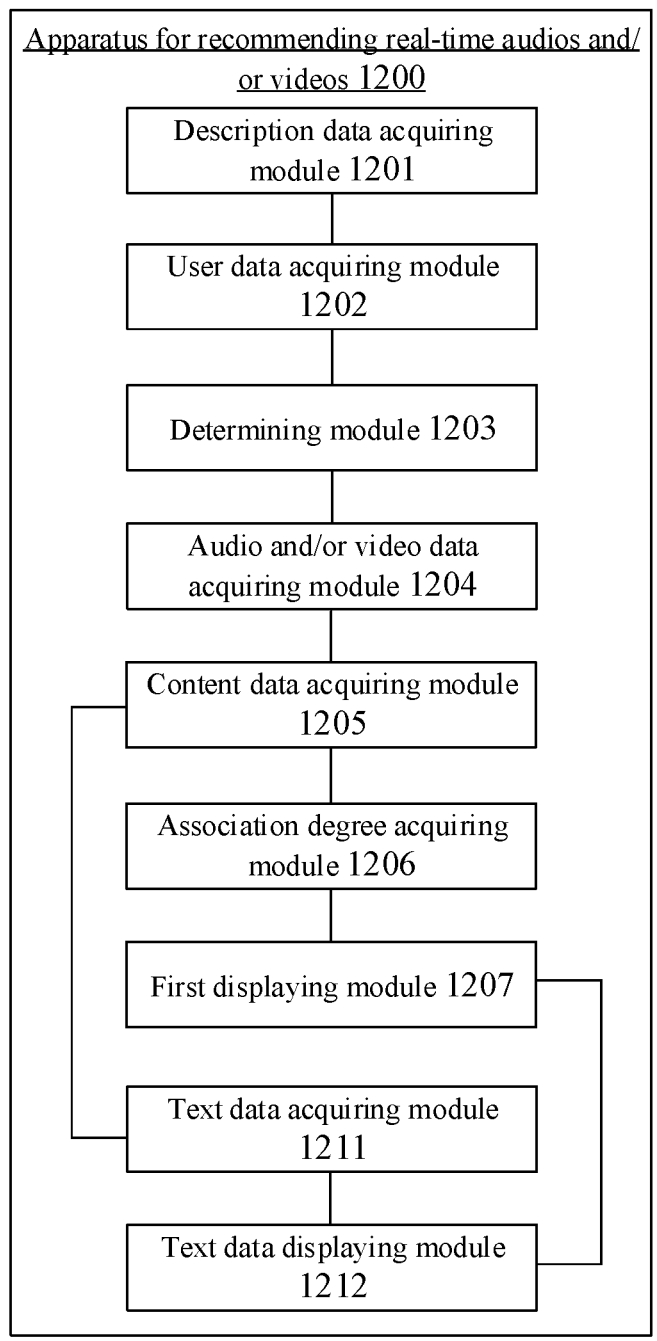
FIG. 12 is a block diagram of another apparatus for recommending real-time audios and/or videos according to some embodiments of the present disclosure.

Optionally, as shown in FIG. 12, which is a block diagram of yet another apparatus for recommending real-time audios and/or videos according to some embodiments of the present disclosure, the apparatus for recommending the real-time audios and/or videos further includes:

a text data acquiring module 1211, configured to acquire text data corresponding to audio data of the candidate real-time audio and/or video corresponding to the recommendation information; and a text data displaying module 1212, configured to display, in response to failure to acquire the operation on the recommendation information within a specified time, the text data in the user interface.

In summary, in the apparatus for recommending the real-time audios and/or videos according to the embodiments of the present disclosure, the real-time audios and/or videos to be watched are screened based on the degree of association between the user data and the description data of the real-time audios and/or videos; and after live streaming is initiated, the screened real-time audios and/or videos are screened again based on the degree of association between the user data and the content data of the real-time audios and/or videos. Through the two times of the screening, the real-time audio and/or video that the user may be interested in can be selected from a large number of the real-time audios and/or videos, and is displayed to the user. In this way, the degree of match between the real-time audio and/or video displayed to the user and the interest of the user is ensured, and the richness of the real-time audio and/or video displayed to the user is improved, thereby improving an effect of recommending the real-time audio and/or video.

Figure 13:
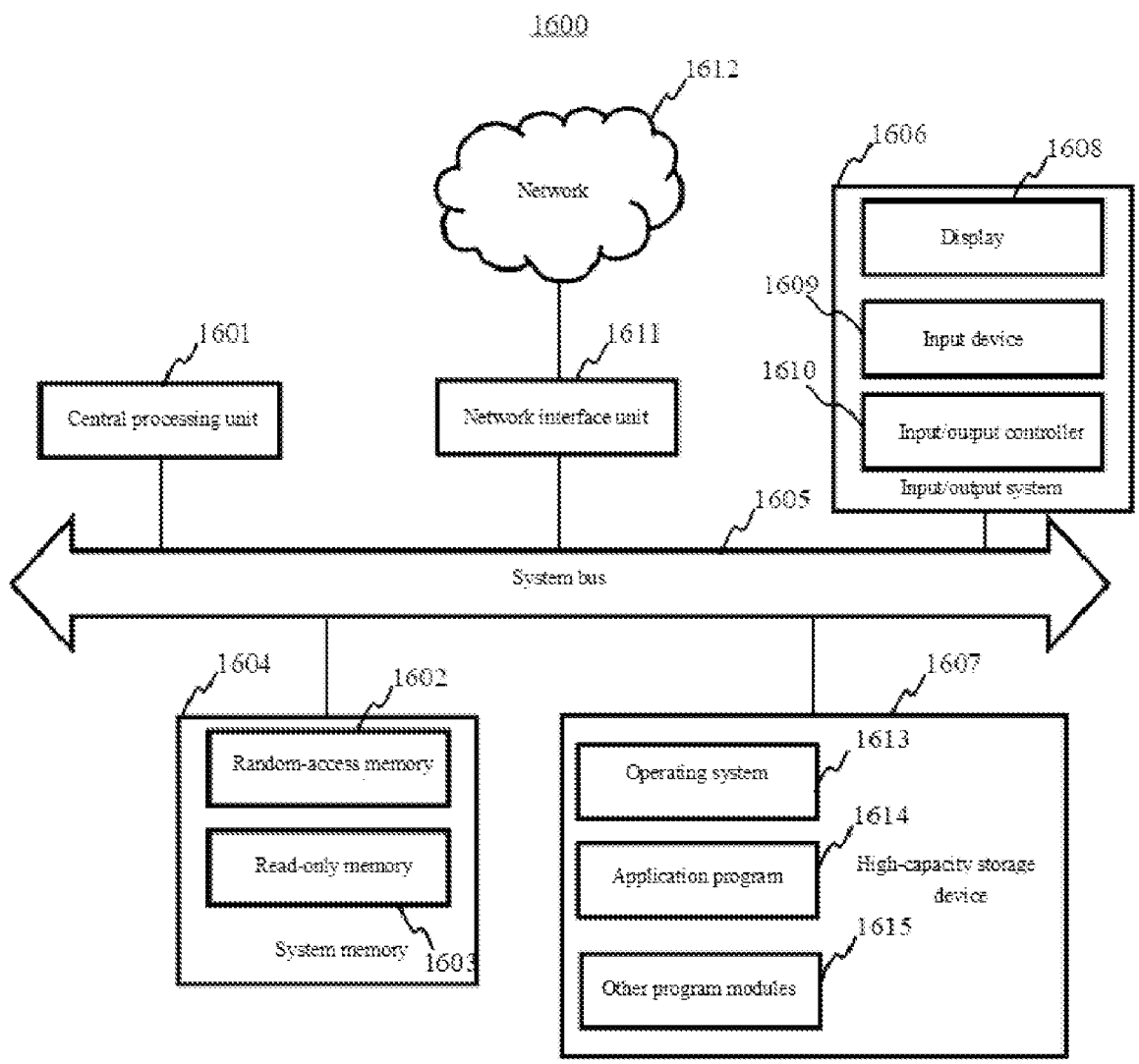
FIG. 13 is a schematic structural diagram of a server according to some embodiments of the present disclosure.

FIG. 13 is a schematic structural diagram of a server provided by some embodiments of the present disclosure. The terminal 1600 includes a central processing unit (CPU) 1601, a system memory 1604 including a random-access memory (RAM) 1602 and a read-only memory (ROM) 1603, and a system bus 1605 connecting the system memory 1604 and the CPU 1601. The server 1600 further includes a basic input/output system (I/O system) 1606 which helps transmit information between various components within the computer, and a high-capacity storage device 1607 for storing an operating system 1613, an application 1614, and other program modules 1615.

The basic I/O system 1606 includes a display 1608 for displaying the information and an input device 1609, such as a mouse or keyboard, for the user to input information. The display 1608 and the input device 1609 are both connected to the CPU 1601 via an input/output controller 1610 that is connected to the system bus 1605. The basic I/O system 1606 may further include an input/output controller 1610 for receiving and processing the input from a plurality of other devices, such as a keyboard, mouse, or electronic stylus. Similarly, the input/output controller 1610 further provides output to a display screen, a printer or other types of output devices.

The high-capacity storage device 1607 is connected to the CPU 1601 by a high-capacity storage controller (not shown) connected to the system bus 1605. The high-capacity storage device 1607 and a computer-readable medium associated therewith provide non-volatile storage for the server 1600. That is, the high-capacity storage device 1607 may include a computer-readable medium (not shown), such as a hard disk or a compact disc read-only memory (CD-ROM) drive.

Without loss of generality, the computer non-transitory readable medium may include a computer storage medium and a communication medium. The computer storage medium includes volatile and non-volatile, removable and non-removable media implemented in any method or technology for storage of information such as a computer-readable instruction, a data structure, a program module or other data. The computer storage medium includes a RAM, a ROM, an erasable programmable read-only memory (EPROM), an electrically erasable programmable read-only memory (EEPROM), a flash memory or other solid-state storage media; a CD-ROM, a digital versatile disc (DVD) or other optical storage; and a tape cartridge, a magnetic tape, a disk storage or other magnetic storage devices. It will be known by a person skilled in the art that the computer storage medium is not limited to above. The above system memory 1604 and the high-capacity storage device 1607 may be collectively referred to as the memory.

According to the various embodiments of the present disclosure, the server 1600 may also be connected to a remote computer on a network through the network, such as the Internet, for operation. That is, the server 1600 may be connected to the network 1612 through a network interface unit 1611 connected to the system bus 1605, or may be connected to other types of networks or remote computer systems (not shown) through the network interface unit 1611.

The memory further includes one or more programs stored in the memory. The CPU 1601 implements any one of the methods for recommending the real-time audios and/or videos according to the above embodiments by executing the one or more programs.

In addition, a device for recommending real-time audios and/or videos is further provided according to some embodiments of the present disclosure. The device for recommending the real-time audios and/or videos includes a processor, and a memory storing at least one instruction, at least one program, a code set, or an instruction set, wherein the processor, when loading and executing the at least one instruction, the at least one program, the code set, or the instruction set, is caused to perform any one of the methods for recommending the real-time audios and/or videos according to the above embodiments.

In addition, a computer non-transitory storage medium storing at least one instruction, at least one program, a code set, or an instruction set is further provided according to some embodiments of the present disclosure, wherein the at least one instruction, the at least one program, the code set, or the instruction set, when loaded and executed by a processor, causes the processor to perform any one of the methods for recommending the real-time audios and/or videos according to the above embodiments.

What is claimed is:

1. A method for recommending a real-time audio and/or video, comprising:
   acquiring description data of a plurality of real-time audios and/or videos, wherein the description data is configured to summarize contents of the plurality of real-time audios and/or videos;
   acquiring user data;
   determining at least one candidate real-time audio and/or video in the plurality of real-time audios and/or videos, wherein a degree of association between the description data of the at least one candidate real-time audio and/or video and the user data is greater than a first specified value;
   acquiring audio and/or video data of the at least one candidate real-time audio and/or video upon initiation of the at least one candidate real-time audio and/or video, wherein the audio and/or video data comprises at least one of video data, audio data, picture data, or document data;
   acquiring, based on the audio and/or video data of the at least one candidate real-time audio and/or video, content data of the at least one candidate real-time audio and/or video, wherein the content data comprises at least one of text data extracted from the video data, text data converted from the audio data, or content contained in the picture data or in the document data;
   acquiring a degree of association between the content data of the at least one candidate real-time audio and/or video and the user data;
   displaying, based on the degree of association between the content data of the at least one candidate real-time audio and/or video and the user data, a target candidate real-time audio and/or video in the at least one candidate real-time audio and/or video in a user interface, wherein the degree of association between the content data of the target candidate real-time audio and/or video and the user data is the highest;
acquiring the number of viewers of each of the real-time audios and/or videos in response to receiving a switching instruction; and
displaying a real-time audio and/or video with the largest number of viewers in the real-time audios and/or videos in the user interface.

2. The method according to claim 1, wherein at least two candidate real-time audios and/or videos are present; and upon acquiring the degree of association between the content data of candidate real-time audios and/or videos and the user data, the method further comprises:
acquiring recommendation information of a first candidate real-time audio and/or video in the at least two candidate real-time audios and/or videos, wherein the first candidate real-time audio and/or video is a candidate real-time audio and/or video in the at least two candidate real-time audios and/or videos except the target candidate real-time audio and/or video, a degree of association between the content data of the first candidate real-time audio and/or video and the user data being greater than a second specified value, and the recommendation information comprises one or more of pictures and texts;
displaying the recommendation information in the user interface; and
displaying, in response to acquiring an operation on the recommendation information, a candidate real-time audio and/or video corresponding to the recommendation information in the user interface.

3. The method according to claim 2, wherein upon displaying the recommendation information in the user interface, the method further comprises:
acquiring text data corresponding to audio data of the candidate real-time audio and/or video corresponding to the recommendation information; and
displaying, in response to a failure to acquire the operation on the recommendation information within a specified time, the text data in the user interface.

4. The method according to claim 3, wherein displaying the text data in the user interface comprises:
displaying a prompt box in the user interface, wherein the text data is comprised in the prompt box.

5. The method according to claim 1, wherein acquiring the user data comprises:
determining at least one target user who is watching the user interface; and
acquiring the user data of the at least one target user.

6. The method according to claim 5, wherein the user data comprises face data of at least one user; and
determining the at least one target user who is watching the user interface comprises:
acquiring an image containing the at least one user; and
determining, by face recognition on the image, the at least one target user who is watching the user interface.

7. The method according to claim 5, wherein acquiring the user data of the at least one target user comprises:
acquiring the user data of the at least one target user from a user database in the case that the user database comprises the user data of the at least one target user; or,
acquiring input information in the case that the user database does not comprise the user data of the at least one target user, and acquiring the user data of the at least one target user based on the input information.

8. The method according to claim 1, wherein upon displaying, based on the degree of association between the content data of the at least one candidate real-time audio and/or video and the user data, the target candidate real-time audio and/or video in the at least one candidate real-time audio and/or video in the user interface, the method further comprises:
acquiring a degree of association between the content data of each of the at least one candidate real-time audio and/or video and user input data in response to receiving the user input data; and
displaying a candidate real-time audio and/or video in the at least one candidate real-time audio and/or video in the user interface, wherein the degree of association between the content data of the candidate real-time audio and/or video and the user input data is the highest.

9. The method according to claim 1, wherein acquiring the degree of association between the content data of the at least one candidate real-time audio and/or video and the user data comprises:
acquiring semantics of the content data by performing semantic analysis on the content data;
acquiring semantics of the user data by performing semantic analysis on the user data; and
determining a similarity between the semantics of the content data and the semantics of the user data as the degree of association between the content data and the user data.

10. A device for recommending a real-time audio and/or video, comprising a processor, and a memory storing at least one instruction, at least one program, a code set, or an instruction set, wherein the processor, when loading and executing the at least one instruction, the at least one program, the code set, or the instruction set, is caused to perform:
acquiring description data of a plurality of real-time audios and/or videos, wherein the description data is configured to summarize contents of the plurality of real-time audios and/or videos;
acquiring user data;
determining at least one candidate real-time audio and/or video in the plurality of real-time audios and/or videos, wherein a degree of association between the description data of the at least one candidate real-time audio and/or video and the user data is greater than a first specified value;
acquiring audio and/or video data of the at least one candidate real-time audio and/or video upon initiation of the at least one candidate real-time audio and/or video, wherein the audio and/or video data comprises at least one of video data, audio data, picture data, or document data;
acquiring, based on the audio and/or video data of the at least one candidate real-time audio and/or video, content data of the at least one candidate real-time audio and/or video, wherein the content data comprises at least one of text data extracted from the video data, text data converted from the audio data, or content contained in the picture data or in the document data;
acquiring a degree of association between the content data of the at least one candidate real-time audio and/or video and the user data;
displaying, based on the degree of association between the content data of the at least one candidate real-time audio and/or video and the user data, a target candidate real-time audio and/or video in the at least one candidate real-time audio and/or video in a user interface, wherein the degree of association between the content data of the target candidate real-time audio and/or video and the user data is the highest;

acquiring the number of viewers of each of the real-time audios and/or videos in response to receiving a switching instruction; and displaying a real-time audio and/or video with the largest number of viewers in the real-time audios and/or videos in the user interface.

11. The device according to claim 10, wherein at least two candidate real-time audios and/or videos are present; and the processor, when loading and executing the at least one instruction, the at least one program, the code set, or the instruction set, is further caused to perform:

acquiring recommendation information of a first candidate real-time audio and/or video in the at least two candidate real-time audios and/or videos, wherein the first candidate real-time audio and/or video is a candidate real-time audio and/or video in the at least two candidate real-time audios and/or videos except the target candidate real-time audio and/or video, a degree of association between the content data of the first candidate real-time audio and/or video and the user data being greater than a second specified value, and the recommendation information comprises one or more of pictures and texts;

displaying the recommendation information in the user interface; and displaying, in response to acquiring an operation on the recommendation information, a candidate real-time audio and/or video corresponding to the recommendation information in the user interface.

12. The device according to claim 11, wherein the processor, when loading and executing the at least one instruction, the at least one program, the code set, or the instruction set, is further caused to perform:

acquiring text data corresponding to audio data of the candidate real-time audio and/or video corresponding to the recommendation information; and displaying, in response to a failure to acquire the operation on the recommendation information within a specified time, the text data in the user interface.

13. The device according to claim 12, wherein the processor, when loading and executing the at least one instruction, the at least one program, the code set, or the instruction set, is further caused to perform:

displaying a prompt box in the user interface, wherein the text data is comprised in the prompt box.

14. The device according to claim 10, wherein the processor, when loading and executing the at least one instruction, the at least one program, the code set, or the instruction set, is further caused to perform:

determining at least one target user who is watching the user interface; and acquiring the user data of the at least one target user.

15. The device according to claim 14, wherein the user data comprises face data of at least one user; and the processor, when loading and executing the at least one instruction, the at least one program, the code set, or the instruction set, is further caused to perform:

acquiring an image containing the at least one user; and determining, by face recognition on the image, the at least one target user who is watching the user interface.

16. The device according to claim 14, wherein the processor, when loading and executing the at least one instruction, the at least one program, the code set, or the instruction set, is further caused to perform:

acquiring the user data of the at least one target user from a user database in the case that the user database comprises the user data of the at least one target user; or, acquiring input information in the case that the user database does not comprise the user data of the at least one target user, and acquiring the user data of the at least one target user based on the input information.

17. A computer non-transitory storage medium storing at least one instruction, at least one program, a code set, or an instruction set, wherein the at least one instruction, the at least one program, the code set, or the instruction set, when loaded and executed by a processor, causes the processor to perform:

acquiring description data of a plurality of real-time audios and/or videos, wherein the description data is configured to summarize contents of the plurality of real-time audios and/or videos;

acquiring user data;

determining at least one candidate real-time audio and/or video in the plurality of real-time audios and/or videos, wherein a degree of association between the description data of the at least one candidate real-time audio and/or video and the user data is greater than a first specified value;

acquiring audio and/or video data of the at least one candidate real-time audio and/or video upon initiation of the at least one candidate real-time audio and/or video, wherein the audio and/or video data comprises at least one of video data, audio data, picture data, or document data;

acquiring, based on the audio and/or video data of the at least one candidate real-time audio and/or video, content data of the at least one candidate real-time audio and/or video, wherein the content data comprises at least one of text data extracted from the video data, text data converted from the audio data, or content contained in the picture data or in the document data;

acquiring a degree of association between the content data of the at least one candidate real-time audio and/or video and the user data;

displaying, based on the degree of association between the content data of the at least one candidate real-time audio and/or video and the user data, a target candidate real-time audio and/or video in the at least one candidate real-time audio and/or video in a user interface, wherein the degree of association between the content data of the target candidate real-time audio and/or video and the user data is the highest;

acquiring the number of viewers of each of the real-time audios and/or videos in response to receiving a switching instruction; and displaying a real-time audio and/or video with the largest number of viewers in the real-time audios and/or videos in the user interface.

* * * * *